Aug. 26, 1930.  G. A. BURNHAM  1,774,417
DISTRIBUTION AND OVERLOAD PROTECTIVE SYSTEM
Filed Dec. 1, 1928
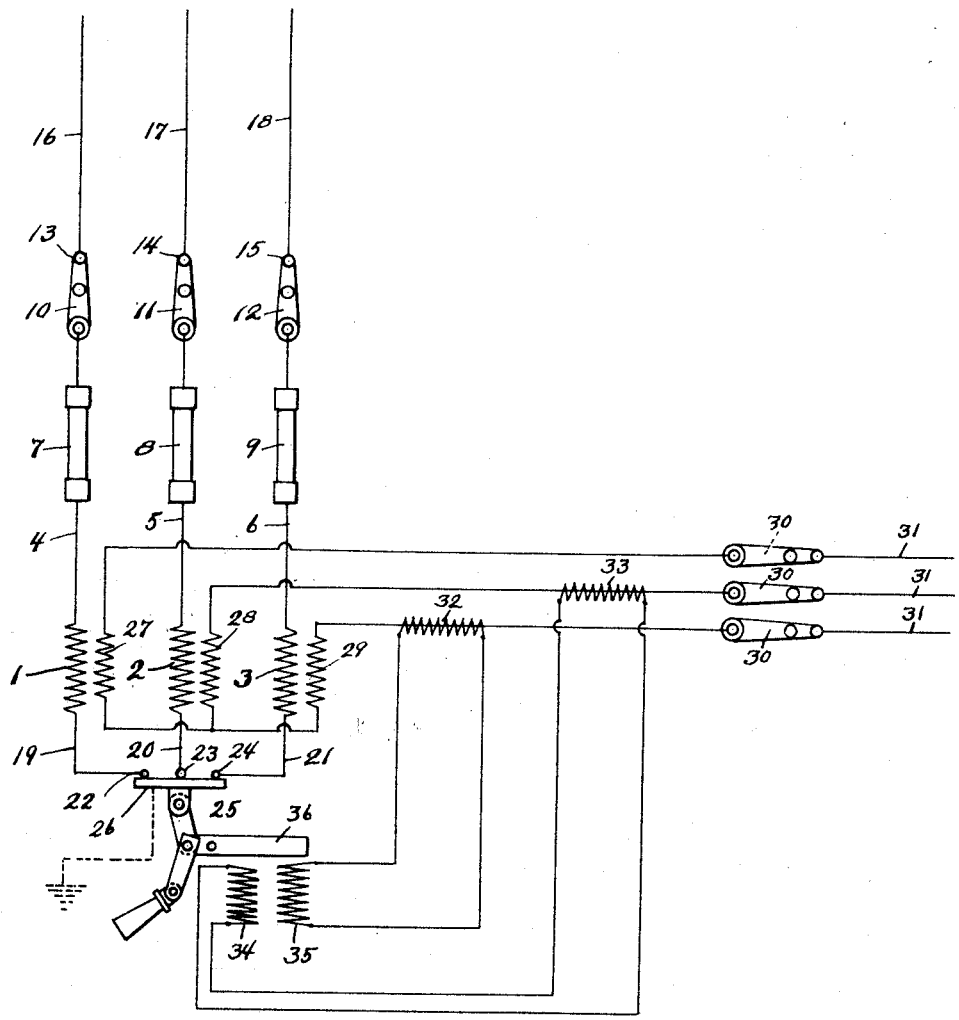
Inventor.
George A. Burnham Patented Aug. 26, 1930

1,774,417

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

DISTRIBUTION AND OVERLOAD PROTECTIVE SYSTEM

Application filed December 1, 1928. Serial No. 323,156.

This invention relates to power distribution and overload protective systems including multi-phase transformers and an overload operated circuit controller associated with each of the multi-phase transformers in such a manner that the reactance of the transformer is utilized to keep down the short circuit power that the circuit controller is called upon to interrupt.
An object of the present invention is the provision of a system as above described with an arrangement of apparatus therein to protect the system against overload in the outgoing low tension lines from the transformer, and also to protect the high tension side of the system against high currents due to faults within the transformer itself.

A further object of the invention is to provide a system of the type above set forth wherein an overload operated circuit interrupter is provided to protect the secondary windings of the transformer and the outgoing secondary leads against overload and short circuit currents, while utilizing the reactance of the transformer to keep down the overload or short circuit power in the interrupter; and to locate the circuit interrupter in such part of the system that it cannot open currents caused by faults or short circuits in the primary windings of the transformer, where the reactance of the transformer can not be utilized to keep down the amount of such short circuit power; and to provide other protective means independent of the circuit interrupter and adapted to operate to interrupt the circuit through the primary windings only at overload currents which are greater than any current that could be set up therein by a short circuit in the outgoing secondary leads.

A further object is generally to improve on distribution and overload protective systems.

The figure is a diagrammatic representation of the power distribution and overload protective system and the apparatus therein embodying the present invention.

In accordance with the present invention the power distribution and overload protective system comprises a high tension step-down multi-phase transformer having high tension primary windings 1, 2 and 3, and high tension terminals 4, 5 and 6, all of which are connected through high tension fuses 7, 8 and 9, which will hereinafter be more fully described, with movable parts of the disconnecting switches 10, 11 and 12. The fixed terminals 13, 14 and 15 of said disconnecting switches are connected separately with incoming high tension leads 16, 17 and 18. The similar terminals 19, 20 and 21 of the primary windings are separately connected to the fixed terminals 22, 23, 24 of an overload responsive circuit interrupter 25. The movable member 26 of said interrupter when closed is adapted to electrically connect said terminals 22, 23, and 24 whereby to form a common connection between all of the primary windings and to connect said windings in star. If desired, the movable switch member may be grounded as illustrated by the dotted lines.

The transformer is provided with low tension secondary windings 27, 28 and 29 which are connected through disconnecting switches 30 to outgoing low tension distribution lines 31. The circuit interrupter is made responsive to overloads in the low tension circuits of the transformer by means of current transformers 32 and 33, which are located in separate outgoing leads of the secondary windings between said windings and the low tension disconnecting switches 30 and separately energize windings of tripping electro-magnets 34 and 35, which magnets act upon a common holding latch 36 of the circuit interrupter to trip the latch upon overload and permit the circuit interrupter to operate.

Due to the location of the circuit interrupter 25 at the common connection of the primary star-connected leads of the transformer, the amount of energy that the circuit interrupter is called upon to interrupt is greatly limited by the reactance of the transformer, and consequently the circuit interrupter will never be called upon to interrupt, say, more than ten times the normal full load of the transformer, even though there be a dead short circuit on the low tension leads 31. Moreover, due to the location of the circuit interrupter and the current transformers 32 and 33 the interrupter is not responsive to overload conditions which exist as a result of a fault in the primary windings 1, 2 and 3 of the transformer. It is important that the interrupter be uninfluenced by faults in the primary windings of the transformer, since in such event the reactance of the transformer is not available to limit the flow of power through the interrupter. Consequently, the interrupter and its current responsive trip coils are so connected in the system that the interrupter is not required to open to interrupt the development of faults in the high tension side of the transformer.

Means is provided independent of the circuit interrupter 25 to protect the transformer from a fault in the primary windings thereof and also from a fault due to the grounding of one of the high tension leads 4, 5 and 6 within the transformer casing. For this purpose the high tension fuses 7, 8 and 9 are located between the incoming high tension lines 16, 17 and 18 and the primary windings 1, 2 and 3 of the transformer. These fuses have such current carrying capacity, however, that they will not open their circuits on any current value which corresponds to the full short circuit current which can develop in the secondary side of the transformer, but will open their circuits at a current in excess of this current value whereby to protect the primary windings against the effect of a fault which may develop therein, and yet be uninfluenced within the power range at which the interrupter is designated to operate.

Variations may be made in the selection and connection of the apparatus comprising the system without departing from the scope of the present invention.

The arrangement of the circuit interrupter in the neutral connection between the primary windings of the transformer is described and claimed in my copending application, Serial No. 175,578, filed March 15, 1927.

I claim:

1. A power distribution and overload protective system comprising a multi-phase transformer having incoming high tension leads and outgoing low tension leads and high tension star connected windings, a circuit interrupter controlling said star connection, means for opening the interrupter which is responsive only to the occurrence of an overload in the low tension leads whereby to open the star connection and disconnect the high tension windings from their common inter-connection, and means which is responsive only to an overload which is greater than that which opens said interrupter for disconnecting said high tension windings from said high tension leads.

2. A power distribution and overload protective system comprising a multi-phase transformer having incoming high tension leads and outgoing low tension leads and high tension star connected windings, a circuit interrupter controlling said star connection, means for opening the interrupter which is responsive only to an overload occurring in the low tension leads whereby to open the star connection and disconnect the high tension windings from their common interconnection, and fuses in said high tension leads and high tension windings arranged to open their circuits only upon the occurrence of a fault in said high tension windings which produces a current that is greater than the current to which said interrupter is responsive.

3. A power distribution and overload protective system comprising a multi-phase transformer having incoming high tension leads and outgoing low tension leads and high tension star connected windings, a circuit interrupter controlling said star connection, means for opening the interrupter upon the occurrence of overload in the low tension leads whereby to open the star connection and disconnect the high tension windings from their common interconnection, and fuses in said high tension leads arranged to open their circuits only on the occasion of a fault in said high tension windings, said fuses characterized by becoming operative only upon the occurrence of an overload current in said high tension windings which is greater than the current value therein corresponding to the full short-circuit current in the secondary side of said transformer.

4. A multi-phase distribution system having high tension and low tension leads, a multi-phase transformer connected between said high and low tension leads and having low tension secondary windings and high tension primary windings provided with a star interconnection, means responsive to overload conditions in said low tension leads for operating said interrupter to break the common connection between said star connected primary windings, and means responsive only to overload currents in said high tension leads which exceed the maximum current therein due to a short-circuited secondary winding for disconnecting said primary windings from said high tension leads.

5. A distribution system having a high tension circuit, a low tension circuit, a transformer having primary and secondary windings in said high and low tension circuits respectively, a circuit interrupter in series with the primary winding and responsive to overload in the low tension circuit only to interrupt the transmission of power between the two circuits, and fuses responsive only to overloads which are greater than can develop in the low tension circuit for disconnecting the transformer from the high tension circuit.

In testimony whereof, I have signed my name to this specification.

GEORGE A. BURNHAM.